A. F. HINES.
Butter-Printing Machines.

No. 140,704. Patented July 8, 1873.

Witnesses.
D. P. Cowl
Edmund Masson

Inventor.
Abraham F. Hines.
By atty A. V. Stoughton.

UNITED STATES PATENT OFFICE.

ABRAHAM F. HINES, OF WASHINGTON, DISTRICT OF COLUMBIA.

IMPROVEMENT IN BUTTER-PRINTING MACHINES.

Specification forming part of Letters Patent No. 140,704, dated July 8, 1873; application filed June 7, 1873.

*To all whom it may concern:*

Be it known that I, ABRAHAM F. HINES, of Washington city, in the county of Washington and District of Columbia, have invented certain new and useful Improvements in Machines for Stamping, Printing, or Pressing Butter and other similarly plastic material; and I do hereby declare the following to be a full, clear, and exact description of the same, reference being had to the accompanying drawings making a part of this specification, in which—

Figure 1:
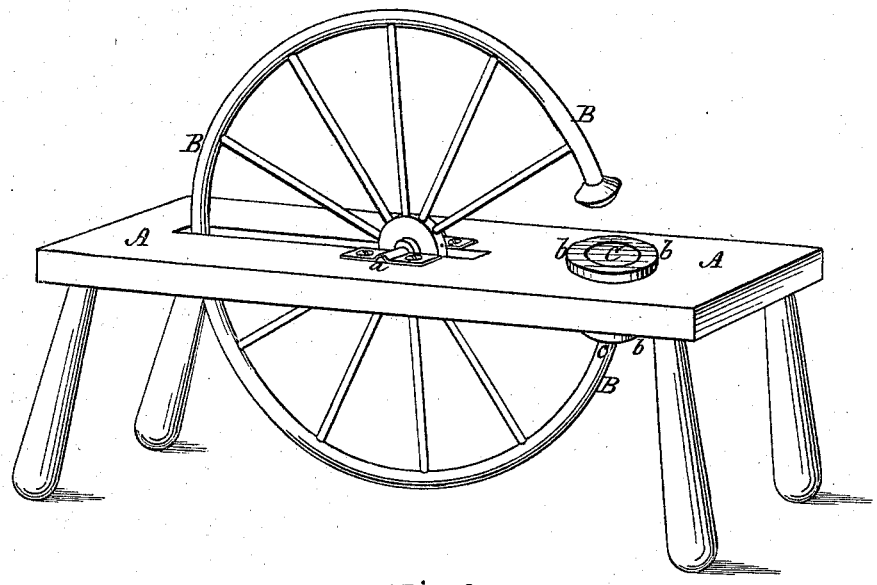
Figure 2:
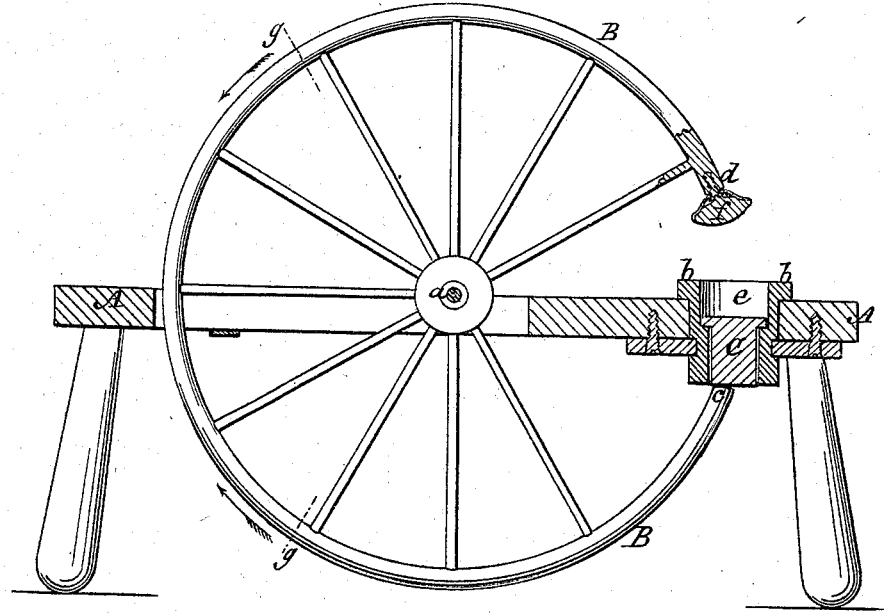

Figure 1 represents a perspective view of the machine, and Fig. 2 represents a side and partially sectional view of the same.

My invention consists in one long or two short segmental arms, rims, or levers, which move about one common center, one end of one of said arms, rims, or levers having a die or mold thereon, in combination with a matrix or box and a shouldered follower therein; said matrix or box being arranged on or about the same horizontal plane as that of the center of motion of the arm, rim, or lever, and so that the two ends of said arm, rim, or lever shall play into said matrix or box.

To enable others skilled in the art to make and use my invention, I will proceed to describe the same with reference to the drawings.

A represents a table, bed, or base of any suitable kind, in or on which a rim, wheel, or segments thereof, B, are hung on a journal or axis at $a$, and so that said rim or wheel may turn upon said axis as a center of motion. On or in the same table, bed, or base A there is arranged a matrix or female mold, $b$, and at such distance from the center of motion $a$ of the rim or wheel B as that the ends $c\ d$ of said rim or segment shall pass into the opening $e$ of the mold or box $b$, said mold or box being of the shape or form of the butter or other soft material to be pressed or printed therein. On one of the ends of the segment B, as shown at $d$, for instance, there is fixed a stamp or die, $f$, upon the face of which may be any figures or letters which are to be stamped upon the article in the mold at $e$. The other end $c$ of the rim may be plain. In the mold $b$ and resting upon shoulders therein is a follower, C, which is loose therein, but cannot drop below a given point—viz, the shoulder in the female mold. And the top of this follower C may be engraved or ornamented so as also to imprint the under side of the butter or other soft material, if desirable to do so.

I prefer to make the stamping or pressing lever B of a wheel-form, as shown in the drawings, because it is better balanced and worked in that way. It is obvious, however, that that portion of the wheel, between the points $g\ g$ and in the direction of the arrows, might be cut away with the spokes that hold that portion, and yet the machine would work in substantially the same way, though what was left might be called two curved levers, and would not be a wheel; but they are connected to the same hub and move about the same center of motion—viz, the point $a$. The movement of the two points $c\ d$ about one and the same center of motion is a thing most important to be done; and whether these two points be connected by a circular rim or two sections or levers is immaterial, though, as stated, I prefer the wheel.

The operation is obvious. The butter or other article to be pressed is placed in the mold at $e$, the die $d$ is brought down hard upon it, printing, stamping, or pressing its figures thereon. By reversing the wheel or raising up the die $d$, the other end $c$ of the rim or curved lever strikes against the bottom of the follower C, raising it, and the butter or other article pressed upon it, up and out of mold, whence it is removed. The stamping or pressing being done at or about the same horizontal plane as that of the center of motion of the rim or wheel, the impression will be quite perfect over the whole surface of the article printed or pressed. If desired to be exactly printed or pressed, the die $f$ may have a yielding motion where it is united to the rim at $d$, so as to come down square or horizontal, and be changed if necessary. The mold $e$ and follower C, as well as the die $f$, may be made of glass or any other vitrified or mineral matter, so that they may be readily cleaned and kept clean. By cutting away a portion of the wheel or rim between the points $g\ g$, as hereinabove described, the machine may be duplicated by arranging another mold and follower in or on the table, and placing a stamping or printing die on one of the cut ends of said rim, as described and shown at $d f$, on the other end of said table.

Having thus fully described my invention, what I claim therein as new, and desire to secure by Letters patent, is—

The combination of the rim or levers B B, the die $f$, and delivery-end $c$, all moving together and around a common center, $a$, with the mold $b$ or $e$ and follower C, as and for the purpose described and represented.

ABRAHAM F. HINES.

Witnesses:
   A. B. STOUGHTON,
   EDMUND MASSON.